United States Patent
Pao et al.

(10) Patent No.: US 12,342,079 B2
(45) Date of Patent: Jun. 24, 2025

(54) IMAGE SENSOR ANTI-SHAKE COMPONENT, CAMERA APPARATUS, AND ELECTRONIC DEVICE

(71) Applicant: Huawei Technologies Co., Ltd., Shenzhen (CN)

(72) Inventors: Chu-Peng Pao, Shenzhen (CN); Li-Te Kuo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 18/309,391

(22) Filed: Apr. 28, 2023

(65) Prior Publication Data

US 2023/0269474 A1 Aug. 24, 2023

Related U.S. Application Data

(63) Continuation of application No. PCT/CN2021/093599, filed on May 13, 2021.

(30) Foreign Application Priority Data

Oct. 29, 2020 (CN) .......................... 202011179461.1

(51) Int. Cl.
  *H04N 23/68* (2023.01)
  *G03B 30/00* (2021.01)
  *H02K 11/215* (2016.01)
  *H02K 11/33* (2016.01)
  (Continued)

(52) U.S. Cl.
  CPC ......... *H04N 23/687* (2023.01); *H02K 11/215* (2016.01); *H02K 11/33* (2016.01); *H02K 41/031* (2013.01); *H04N 23/55* (2023.01); *G03B 30/00* (2021.01)

(58) Field of Classification Search
  CPC ...... G03B 30/00; H02K 11/215; H02K 11/33; H02K 41/031; H04N 23/54; H04N 23/55; H04N 23/57; H04N 23/687
  See application file for complete search history.

(56) References Cited

U.S. PATENT DOCUMENTS

| | | | |
|---|---|---|---|
| 9,001,218 B2 | 4/2015 | Ishizue | |
| 11,412,112 B2* | 8/2022 | Wade | H04N 23/687 |
| 2006/0082658 A1 | 4/2006 | Lee et al. | |

(Continued)

FOREIGN PATENT DOCUMENTS

| CN | 1763625 A | 4/2006 |
|---|---|---|
| CN | 101959012 A | 1/2011 |

(Continued)

*Primary Examiner* — Amy R Hsu
(74) *Attorney, Agent, or Firm* — Conley Rose, P.C.

(57) ABSTRACT

An image sensor anti-shake component includes a fixed component, a rotating component, a movable component, and a drive component. The fixed component includes a base, a cover, and a first circuit board. The rotating component includes a rotating platform, a second circuit board, and an image sensor. The movable component is connected to the fixed component and the rotating component such that the rotating component is axially fastened. When the drive component drives the rotating component to move, the rotating component can only rotate relative to the fixed component and cannot move. The drive component includes a coil and a permanent magnet that are in a one-to-one correspondence.

20 Claims, 9 Drawing Sheets

(51) Int. Cl.
*H02K 41/03* (2006.01)
*H04N 23/55* (2023.01)

(56) References Cited

U.S. PATENT DOCUMENTS

| | | | |
|---|---|---|---|
| 2006/0133786 A1* | 6/2006 | Teramoto | H04N 23/687 |
| | | | 348/E5.046 |
| 2006/0269262 A1 | 11/2006 | Shin et al. | |
| 2011/0013895 A1 | 1/2011 | Chiang | |
| 2012/0038784 A1* | 2/2012 | Irisawa | G03B 5/00 |
| | | | 348/208.7 |
| 2012/0249814 A1 | 10/2012 | Miyoshi | |
| 2013/0021485 A1 | 1/2013 | Hsu | |
| 2014/0354833 A1* | 12/2014 | Takizawa | H04N 23/55 |
| | | | 362/372 |
| 2014/0362284 A1 | 12/2014 | Shin et al. | |
| 2015/0256756 A1 | 9/2015 | Sakurai | |
| 2016/0330375 A1 | 11/2016 | Sekimoto | |
| 2017/0171440 A1 | 6/2017 | Park et al. | |
| 2018/0120674 A1* | 5/2018 | Avivi | G03B 3/10 |
| 2018/0321503 A1 | 11/2018 | Brown | |
| 2021/0329170 A1* | 10/2021 | Osaka | H04N 23/55 |
| 2022/0201167 A1 | 6/2022 | Chen | |

FOREIGN PATENT DOCUMENTS

| | | |
|---|---|---|
| CN | 102724448 A | 10/2012 |
| CN | 105900006 B | 5/2018 |
| CN | 108141541 A | 6/2018 |
| CN | 108432231 A | 8/2018 |
| CN | 104238238 B | 1/2019 |
| CN | 109951623 A | 6/2019 |
| CN | 209517305 U | 10/2019 |
| CN | 110730285 A | 1/2020 |
| CN | 111698352 A | 9/2020 |
| JP | 2019203908 A | 11/2019 |
| JP | 2019215426 A | 12/2019 |
| KR | 102146385 B1 | 8/2020 |
| WO | 2019018364 A1 | 1/2019 |
| WO | 2019150188 A1 | 8/2019 |

* cited by examiner

IMAGE SENSOR ANTI-SHAKE COMPONENT, CAMERA APPARATUS, AND ELECTRONIC DEVICE

CROSS-REFERENCE TO RELATED APPLICATIONS

This is a continuation of International Patent Application No. PCT/CN2021/093599 filed on May 13, 2021, which claims priority to Chinese Patent Application No. 202011179461.1 filed on Oct. 29, 2020. The disclosures of the aforementioned applications are hereby incorporated by reference in their entireties.

TECHNICAL FIELD

This application relates to the field of camera device technologies, and in particular, to an image sensor anti-shake component, a camera apparatus, and an electronic device.

Background

Photography technologies have been important technical means in life and production, such as photography and photography. With development of a technology of a mobile device such as a mobile terminal, a user has an increasingly high requirement for photographing by using the mobile device and photography quality. When the user performs photographing by using the mobile device, a photographing result is easily blurred because of a shake of a hand or a photographed object, or limitation of a photography optical environment. To improve this situation, an optical image stabilization technology needs to be introduced.

In a current optical image stabilization technology, a shake situation of a camera apparatus may be detected, and anti-motion compensation of a total of five axes including X, Y, Roll, Yaw, and Pitch may be performed on a lens and an image sensor that are in the camera apparatus, to implement an anti-shake function during photographing. Moving the lens may implement anti-motion compensation in two directions of Yaw and Pitch, and moving the image sensor may implement anti-motion compensation in three directions of X, Y, and Roll.

Figure 1A:
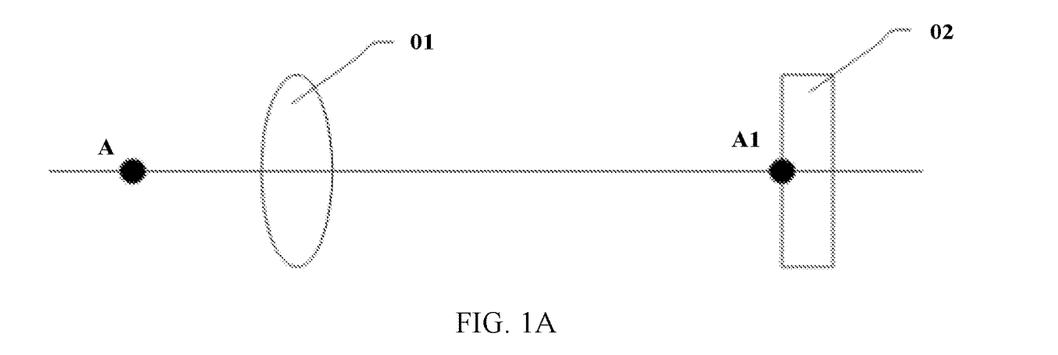
FIG. 1A to FIG. 1C are schematic diagrams of principles of performing anti-shake compensation for an image sensor of a camera apparatus.
Figure 1B:
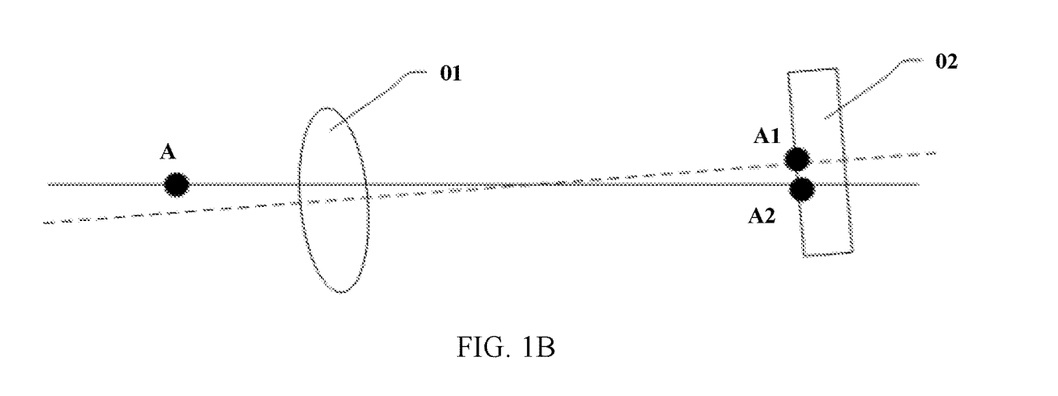
Figure 1C:
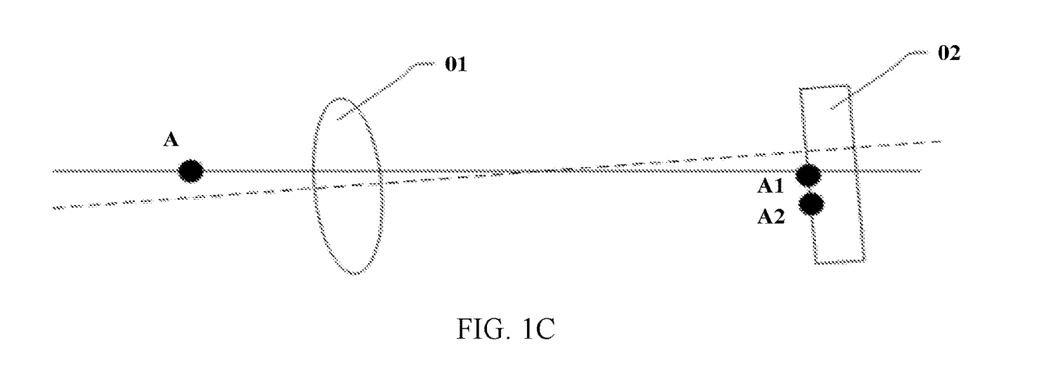

FIG. 1A to FIG. 1C are schematic diagrams of principles of performing anti-shake compensation for an image sensor of a camera apparatus. As shown in FIG. 1A, a light ray of an object setting point A passes through a lens 01 and reaches a location A1 of an image sensor 02, and the object setting point A is imaged at the location A1 of the image sensor 02. During photographing, the camera apparatus shakes. As shown in FIG. 1B, if no adjustment is performed, the object setting point A passes through the lens 01, and the object setting point A is imaged at a location A2 of the image sensor 02, which causes a problem of double image on a photographed picture. As shown in FIG. 1C, a location of the image sensor 02 may be adjusted, so that the object setting point A is imaged at the location A1 of the image sensor 02, to capture a clear picture.

SUMMARY

This application provides an image sensor anti-shake component, a camera apparatus, and an electronic device, to adjust a location of an image sensor and implement anti-shake of the camera apparatus. The image sensor anti-shake component has a simple structure and a reliable motion process.

According to a first aspect, this application provides an image sensor anti-shake component. The sensor anti-shake component includes a fixed component, a rotating component, a movable component, and a drive component. The fixed component includes a base, a cover, and a first circuit board. The cover is fastened to the base, to form a housing of the image sensor anti-shake component. The first circuit board is fastened to the base. The rotating component includes a rotating platform, a second circuit board, and an image sensor. The second circuit board is fastened to the rotating platform, and the image sensor is fastened to the second circuit board, so that the image sensor can move with the rotating platform. The image sensor is further electrically connected to the second circuit board, to transmit, by using the second circuit board, an image signal obtained by the image sensor to an external device. The movable component connects the fixed component to the rotating component, supports the rotating component, and axially fastens the rotating component, so that the rotating component and the fixed component can be axially fastened along a direction of an optical axis of a light ray incident into the image sensor, and when the drive component drives the rotating component to move, the rotating component can only rotate relative to the fixed component and cannot move. The drive component includes a coil and a permanent magnet that are in a one-to-one correspondence. In other words, each permanent magnet corresponds to one coil. The coil and the permanent magnet are respectively fastened to the rotating component and the fixed component, so that when the coil and the permanent magnet rotate relative to each other, the rotating component can rotate relative to the fixed component. Specifically, the coil may be fastened to and electrically connected to the first circuit board. To be specific, the coil is fastened to the fixed component, and the permanent magnet is fastened to the rotating platform. In other words, the permanent magnet is fastened to the rotating component. Alternatively, the permanent magnet may be fastened to the base. To be specific, the permanent magnet is fastened to the fixed component, and the coil is fastened to and electrically connected to the second circuit board. In other words, the coil is fastened to the rotating component. The coil generates a magnetic field after a current passes through, and the permanent magnet moves relative to the coil under an impact of the magnetic field generated by the coil, to drive the rotating component to rotate along a first plane and relative to the fixed component by using the movable component. The first plane is a plane perpendicular to the optical axis of the light ray incident into the image sensor. In this solution, the rotating component is axially fastened relative to the fixed component, and may only move along a circumferential direction. In this case, a connection between the rotating component and the fixed component is reliable, and a motion process is stable.

The drive component may further include a drive chip. The drive chip is connected to the coil and the external device via a signal separately. Specifically, the drive chip may be electrically connected to the coil and the external device by using a circuit board, so that the drive chip can determine a shake situation of a photographed picture from the camera apparatus based on a signal of the external device, to control a direction and magnitude of a current passing through the coil. In this way, a direction and an angle of rotation of the rotating component can be controlled, to adapt to a shake of the camera apparatus and improve an automatic anti-shake function of the camera apparatus.

The drive component may further include a location sensor. The location sensor is configured to collect location information of the rotating platform, and is connected to the drive chip via a signal, so that the drive chip can determine a location of the rotating component based on a signal of the location sensor, and the location of the rotating component may be used as a feedback signal. The drive chip may determine whether the image sensor has moved to a location that needs to be moved, to improve precision of the image sensor anti-shake component.

To facilitate assembly of the image sensor anti-shake component, the drive chip and the location sensor may be located on a same side as the coil. This reduces a dynamic connection between the fixed component and the rotating component, reduces a circuit break risk, and improves reliability of the image sensor anti-shake component.

The movable component may further include a flexible circuit board. The flexible circuit board is connected between the image sensor and the external device. Specifically, the flexible circuit board may be electrically connected to the second circuit board, to enable the rotating platform to rotate and transmit a signal of the image sensor to the outside. To improve reliability, a large area of the flexible circuit board may be fastened to the second circuit board, thereby reducing the circuit break risk.

The movable component may further include an elastic reset part. The elastic reset part is connected between the rotating platform and the base. After the drive component drives the rotating platform to rotate, the rotating platform may be reset along the first plane, to perform next photographing.

The movable component specifically includes a middle rotating part and a peripheral supporting part. The middle rotating part is connected between the rotating platform and the base, so that the rotating platform is axially fastened to the base. To be specific, the rotating platform can only rotate relative to the base. The peripheral supporting part is located on a periphery of the middle rotating part, and the peripheral supporting part and the middle rotating part form a plane supporting part. To be specific, the rotating platform may be kept on the first plane without a tilt, thereby ensuring accuracy of the image sensor.

A specific structure of the peripheral supporting part is not limited. In a technical solution, the peripheral supporting part may include at least two rolling balls, and the at least two rolling balls are disposed on the periphery of the middle rotating part, to form the plane supporting part together with the middle rotating part. The rotating platform does not need to be disposed in an accommodating slot adapted to the rolling balls. In this case, a rolling ball structure has no limitation on a location of the rotating platform and only has a function of supporting, to ensure a smooth rotation process of the rotating platform.

A specific structure of the middle rotating part is not limited. In a technical solution, the middle rotating part includes a central rolling ball and rolling ball accommodating space. The rolling ball accommodating space includes a first part and a second part. The first part is fastened to the base, and the second part is fastened to the rotating platform. The central rolling ball is accommodated in the rolling ball accommodating space, and a location of the central rolling ball is limited by a side wall of the first part and a side wall of the second part, so that the central rolling ball can only roll in the rolling ball accommodating space and cannot move. In this way, the rotating component can only rotate relative to the fixed component and cannot move.

In another technical solution, the middle rotating part may further include a middle rotating shaft and a shaft hole. Specifically, the middle rotating shaft may be located on the rotating platform, and the shaft hole may be located on the base. Alternatively, the shaft hole is located on the rotating platform, and the middle rotating shaft is located on the base. The middle rotating shaft is adapted to the shaft hole, so that the middle rotating shaft can be inserted into the shaft hole, and a side wall of the shaft hole can limit a location of the middle rotating shaft. In this way, the rotating platform can only rotate relative to the base and cannot move.

When the middle rotating shaft and the shaft hole are specifically disposed, the middle rotating shaft may be a column-shaped middle rotating shaft, the shaft hole may be a cylindrical shaft hole, and an area of a section that is of the column-shaped middle rotating shaft and that is parallel to the first plane gradually increases along a direction away from the shaft hole. In this solution, the column-shaped middle rotating shaft is similar to a cone, so that it is convenient to mount the middle rotating shaft into the shaft hole. In addition, the column-shaped middle rotating shaft and the cylindrical shaft hole are in line contact, so that the rotating platform is not likely to tilt. This helps to improve an anti-shake effect of the image sensor.

In still another technical solution, the middle rotating part may further include a bearing ball and a bearing slot for accommodating the bearing ball. In this solution, a plurality of bearing balls are specifically included. After the plurality of bearing balls are accommodated in the bearing slot, the plane supporting part is formed. Therefore, the bearing ball and the bearing slot in this solution may also be used as a peripheral supporting part in addition to the middle rotating part. This helps to simplify a mounting structure of the image sensor anti-shake component.

In this solution, the image sensor anti-shake component may further include a first magnetic component. The first magnetic component is located on a side of the coil facing away from the permanent magnet, and is magnetically attached to the permanent magnet. In this solution, there is a trend between the fixed component and the rotating component to be close to each other. Specifically, the fixed component and the rotating component may closely press against the movable component separately, to improve stability of a structure of the image sensor anti-shake component. In addition, more magnetic lines of the permanent magnet may pass through the coil, to improve a driving effect of the coil on the permanent magnet.

The image sensor anti-shake component may further include a second magnetic component. The second magnetic component is located between the image sensor and the permanent magnet, and is configured to shield interference from the permanent magnet to the image sensor, to ensure precision of the image sensor.

In addition, the image sensor anti-shake component further includes an infrared light filter, and the infrared light filter is disposed opposite to the image sensor. In this solution, the infrared light filter of the camera apparatus may be assembled into the image sensor anti-shake component, to simplify an assembly process of the camera apparatus later. Specifically, the infrared light filter may be mounted on the rotating platform or the cover.

According to a second aspect, this application further provides a camera apparatus. The camera apparatus includes a lens component and the image sensor anti-shake component according to any one of the foregoing technical solutions. An optical axis of the lens component is perpendicular to the first plane. The lens component is mounted on a side of an image sensor facing away from a circuit board. Specifically, the lens component may be mounted on the cover of the image sensor anti-shake component. In this solution, a deflection amplitude of the image sensor of the image sensor anti-shake component of the camera apparatus is large. In this case, the camera apparatus may have a large compensation capability. In addition, in this solution, an assembly process of the camera apparatus is simple, and the image sensor anti-shake component may be accepted before assembly. This helps to improve a product yield of the camera apparatus.

The camera apparatus may be a periscope camera apparatus. The periscope camera apparatus includes a reflection component, a lens component, and an image sensor anti-shake component. The periscope camera apparatus utilizes a reflection function of the reflection component, so that an optical axis of the lens component of the camera apparatus is perpendicular to an optical axis of a light ray incident into the camera apparatus, and the camera apparatus can be laterally disposed in an electronic device.

According to a third aspect, this application further provides an electronic device. The electronic device includes the foregoing camera apparatus. The electronic device has a good anti-shake compensation capability and a good imaging effect. This helps to thin the electronic device.

REFERENCE NUMERALS

Background

01—lens; and
02—image sensor.

Embodiments of this Application

010—display screen;
020—rear cover;
030—camera apparatus;
031—reflection component;
032—lens component;
033—image sensor anti-shake component;
100—fixed component;
110—base;
120—first circuit board;
130—cover;
200—rotating component;
210—rotating platform;
220—second circuit board;
230—image sensor;
240—flexible circuit board;
250—infrared light filter;
260—light filter holder;
300—movable component;
310—middle rotating part;
311—central rolling ball;
312—rolling ball accommodating space;
3121—first part;
3122—second part;
313—middle rotating shaft;
314—shaft hole;
315—bearing ball;
316—bearing slot;
320—peripheral supporting part;
321—rolling ball;
400—drive component;
410—coil;
420—permanent magnet;
430—drive chip;
440—location sensor;
450—Hall permanent magnet;
460—first magnetic component; and
470—second magnetic component.

DESCRIPTION OF EMBODIMENTS

To make the objectives, technical solutions, and advantages of this application clearer, the following further describes this application in detail with reference to the accompanying drawings.

The terms used in the following embodiments are merely for the purpose of describing specific embodiments, but are not intended to limit this application. As used in the specification of this application and in the appended claims, the singular expressions "a", "a kind of", "the", and "this" are intended to also include, for example, "one or more", unless the context clearly indicates to the contrary.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

With development of a technology of a camera apparatus, more and more electronic devices have a photographing function, and the camera apparatus is also applied in many fields such as production and life. In application, the camera apparatus may be in a motion state or a photographed object may be in a motion state. Therefore, a case such as double image or distortion may easily occur on a photographed picture, resulting in a poor photographing effect. Particularly, when the camera apparatus is applied to a mobile terminal such as a smartphone or an aerial photographing drone, an anti-shake requirement for the camera apparatus is also higher.

Figure 2:
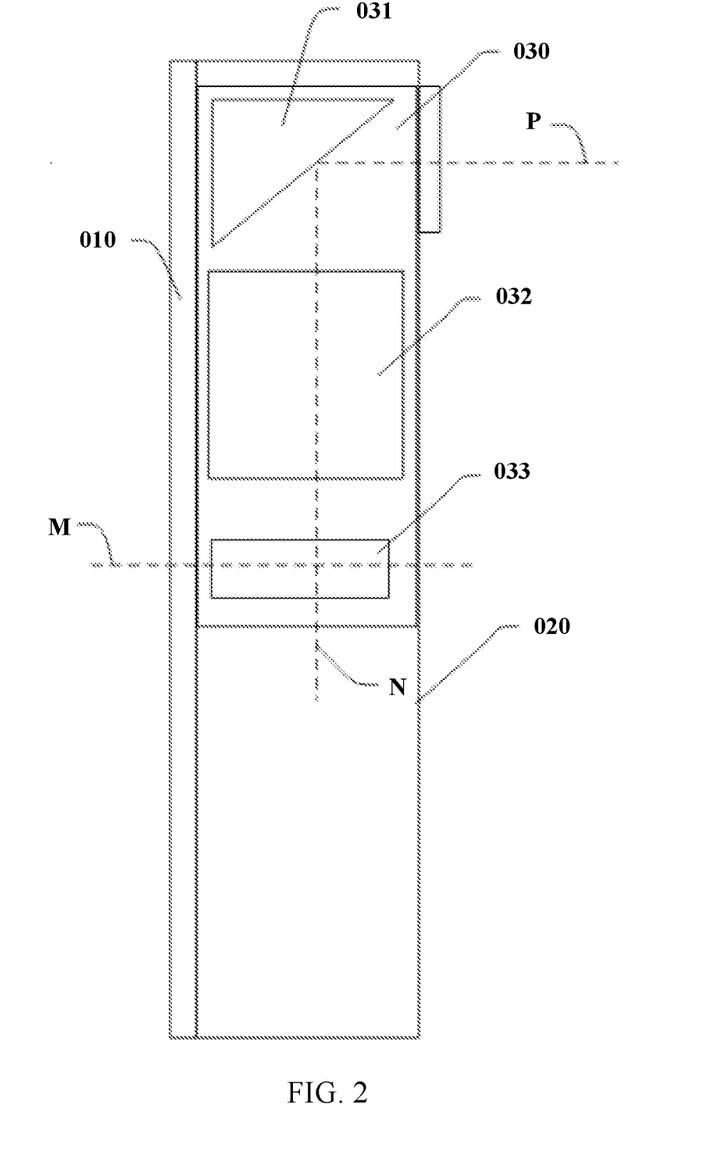
FIG. 2 is a schematic diagram of a structure of an electronic device according to an embodiment of this application.

FIG. 2 is a schematic diagram of a structure of an electronic device according to an embodiment of this application. As shown in FIG. 2, the electronic device provided in this embodiment of this application includes a display screen 010, a rear cover 020, and a camera apparatus 030, to implement a photographing function of the electronic device. The display screen 010 is disposed opposite to the rear cover 020, and the camera apparatus 030 is disposed between the display screen 010 and the rear cover 020. In a specific embodiment, the electronic device may be a smartphone, a tablet computer, a wearable device, a surveillance camera, various cameras, or the like. These are not enumerated one by one in this application. The camera apparatus includes a lens component 032 and an image sensor anti-shake component 033. An optical axis of the lens component 032 is perpendicular to an image sensor 230 of the image sensor anti-shake component 033. The image sensor anti-shake component 033 may perform motion compensation for a shake occurring during photographing performed by the camera apparatus 030, so that the camera apparatus 030 has a good anti-shake effect. The image sensor anti-shake component 033 has a reliable structure. This can implement large rotation of the image sensor 230.

Figure 3:
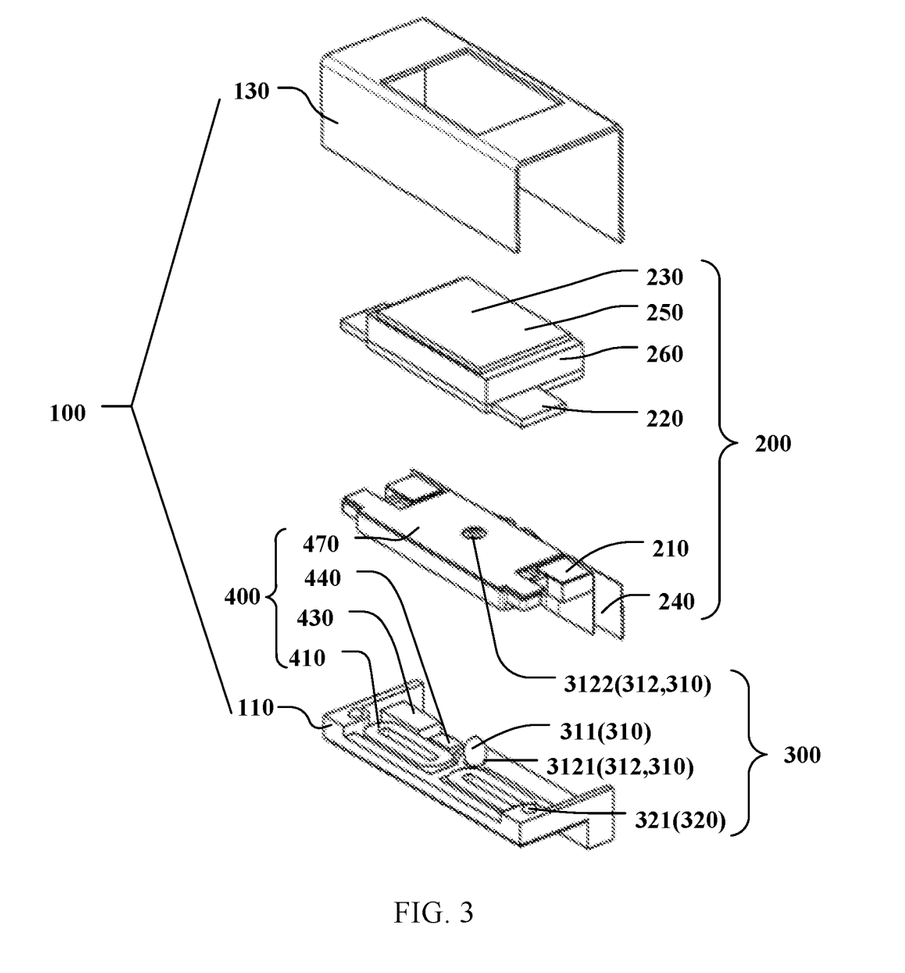
FIG. 3 is a schematic diagram of an exploded structure of an image sensor anti-shake component according to an embodiment of this application.
Figure 4:
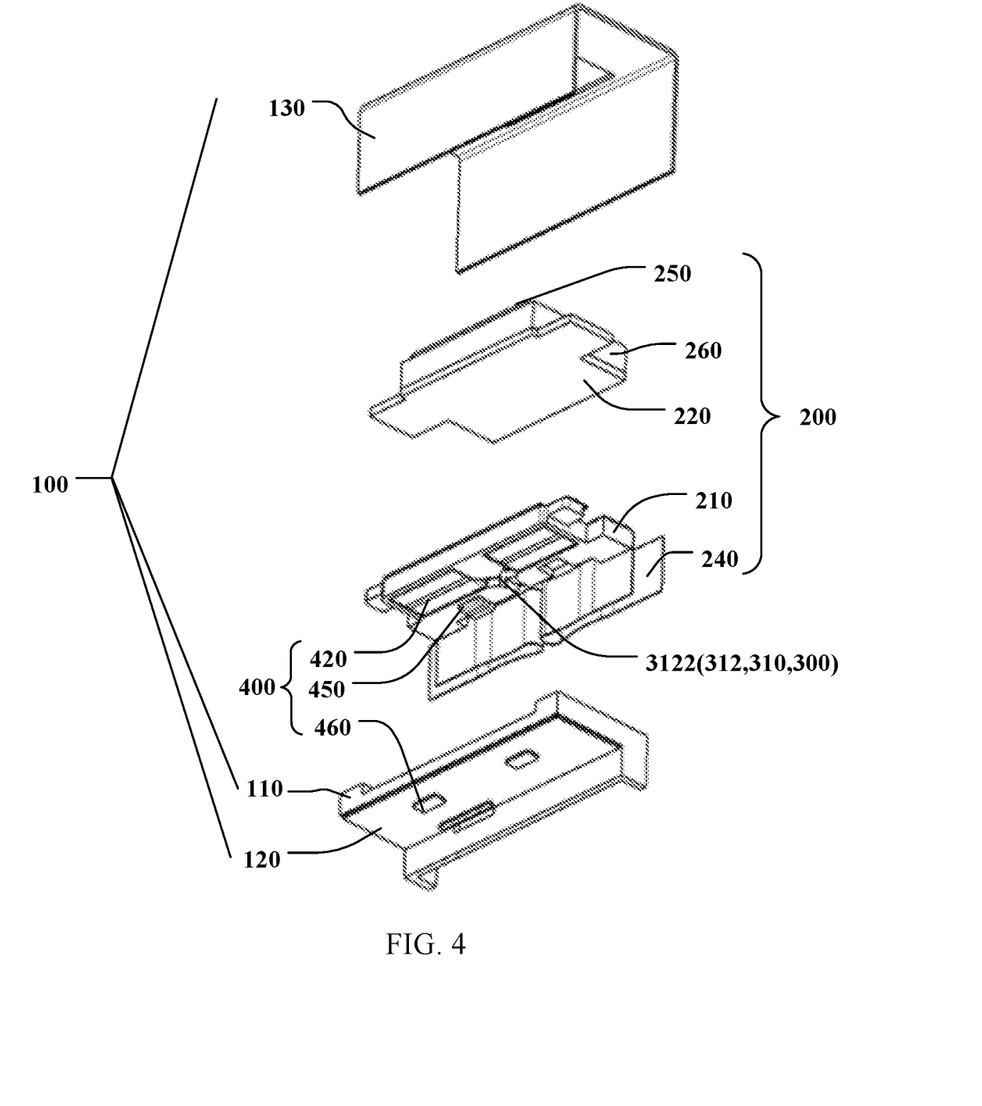
FIG. 4 is another schematic diagram of an exploded structure of an image sensor anti-shake component according to an embodiment of this application.

FIG. 3 is a schematic diagram of an exploded structure of an image sensor anti-shake component according to an embodiment of this application. FIG. 4 is another schematic diagram of an exploded structure of an image sensor anti-shake component according to an embodiment of this application.

As shown in FIG. 2, FIG. 3, and FIG. 4, the image sensor anti-shake component includes at least some parts: a fixed component 100, a rotating component 200, a movable component 300, and a drive component 400. The fixed component 100 includes a base 110 and a first circuit board 120. The first circuit board 120 is fastened to the base 110. When the image sensor 230 works, the fixed component 100 is fixedly disposed. The rotating component 200 includes a rotating platform 210, a second circuit board 220, and the image sensor 230. The second circuit board 220 is fastened to the rotating platform 210, and the image sensor 230 is fastened to and electrically connected to the second circuit board 220. In this case, the image sensor 230 may move along with the rotating platform 210. The movable component 300 is connected between the fixed component 100 and the rotating component 200, so that the rotating component 200 and the fixed component 100 are axially fastened along a direction of an optical axis of a light ray incident into the image sensor 230, but are not fastened in a circumferential direction, so that the rotating component 200 and the fixed component 100 can only rotate along a first plane M. The first plane M is a plane perpendicular to the optical axis of the light ray incident into the image sensor 230. The drive component 400 includes a coil 410 and a permanent magnet 420. The coil 410 and the permanent magnet 420 are in a one-to-one correspondence. When a current passes through the coil 410, a magnetic field may be generated, and the permanent magnet 420 may move relative to the coil 410 under an action of the magnetic field. The coil 410 and the permanent magnet 420 are respectively fastened to the fixed component 100 and the rotating component 200. Certainly, the coil 410 may be fastened to the fixed component 100, and electrically connected to and fastened to the first circuit board 120, and the permanent magnet 420 may be fastened to the rotating component 200, specifically, may be fastened to the rotating platform 210. Alternatively, the coil 410 may be fastened to the rotating component 200, and electrically connected to the second circuit board 220, and the permanent magnet 420 may be fastened to the fixed component 100, specifically, may be fastened to the base 110. Therefore, after the coil 410 is energized, the coil 410 and the permanent magnet 420 can move relatively, to drive the rotating component 200 to move relative to the fixed component 100. Because the rotating component 200 and the fixed component 100 can only rotate along the first plane M, the image sensor 230 rotates relative to the lens component, to implement anti-shake compensation. In this solution, the image sensor anti-shake component has a reliable structure. It is convenient to assemble the image sensor anti-shake component, and rotation of the rotating component 200 is not limited, so that rotation at a large angle can be implemented. Therefore, an anti-shake compensation capability is strong.

When the image sensor anti-shake component is mounted on the camera apparatus, the coil 410 generates the magnetic field under an action of the current, and the magnetic field applies a driving force to the permanent magnet 420 to drive the permanent magnet 420 to move relative to the coil 410. Because the coil 410 and the permanent magnet 420 are respectively fastened to the fixed component 100 and the rotating component 200, and the rotating component 200 is axially fastened to the fixed component 100, the rotating component 200 may be driven to rotate relative to the fixed component 100. When a magnitude of the current passing through the coil 410 is adjusted, a driving force applied by the coil 410 to the permanent magnet 420 is changed, to adjust a rotation magnitude of the image sensor 230. When a direction of the current passing through the coil 410 is adjusted, a rotation direction of the image sensor 230 may be adjusted. Therefore, the image sensor anti-shake component may drive, by using the coil 410 based on a shake situation of a photographed image, the permanent magnet 420 to move, and adjust an angle relationship between the image sensor 230 and the lens component, to implement an anti-shake function of the camera apparatus. In this solution, the rotating component 200 is axially fastened relative to the fixed component 100, and may only move along a circumferential direction. In this case, a connection between the rotating component 200 and the fixed component 100 is reliable, and a motion process is stable.

In this solution, the coil 410 may be fastened to the base 110, and is fastened to and electrically connected to the first circuit board 120 of the base 110, and the permanent magnet 420 is fastened to the rotating platform 210. In this case, a distance between the coil 410 and the image sensor 230 and a distance between the first circuit board 120 and the image sensor 230 are relatively long. This may reduce electromagnetic interference and thermal interference on the image sensor 230, increase a signal-to-noise ratio of the image sensor 230, and improve precision of the image sensor 230. Therefore, the solution can improve a compensation capability of optical image stabilization of the image sensor anti-shake component. The permanent magnet 420 may be disposed on a side that is of the rotating platform 210 and on which the image sensor 230 is located, or may be disposed on a side of the rotating platform 210 facing away from the image sensor 230. The permanent magnet 420 is disposed opposite to the image sensor 230. This facilitates heat dissipation of the image sensor 230 by using the permanent magnet 420. Specifically, the permanent magnet 420 may be fastened by bonding, by welding, by using a screw joint, or by laser bonding.

In addition, if the coil 410 is fastened to the base 110, and the permanent magnet 420 is fastened to the rotating platform 210, only one group of signal transmission components connected to the image sensor 230 needs to be disposed. However, if the coil 410 and the image sensor 230 are fixedly disposed relatively, a group of signal transmission components connected to the coil 410 needs to be additionally disposed. This occupies large space, and large avoidance space needs to be provided. Therefore, the technical solution helps to reduce space occupied by a moving signal transmission component and avoidance space required by movement of the signal transmission component. Referring to FIG. 2, the camera apparatus may be a periscope camera apparatus. The periscope camera apparatus includes a reflection component 031, a lens component 032, and an image sensor anti-shake component 033. The periscope camera apparatus utilizes a reflection function of the reflection component 031, so that an optical axis P of a light ray incident into the camera apparatus is perpendicular to an optical axis N of the lens component 032 of the camera apparatus. As shown in FIG. 2, the first plane MM may be perpendicular to the display screen 010. In this case, when rotating, the rotating platform 210 of the image sensor anti-shake component 033 needs to move in a thickness direction of the electronic device. In this solution, fewer signal transmission components need to move. Therefore, occupied space and required avoidance space are small, which helps to thin the electronic device.

As shown in FIG. 3, the fixed component 100 of the image sensor anti-shake component may further include a cover 130. The cover 130 is fastened to the base 110, and accommodating space having the rotating platform 210 is formed. Specifically, a manner of fastening the cover 130 to the base 110 is not limited. For example, the cover 130 may be fastened to the base 110 by using an adhesive, by welding, by laser bonding, by using a screw joint, by clamping, or the like. The cover 130 may prevent an impurity from entering the image sensor anti-shake component, and may also implement light shielding to prevent external light from entering the image sensor 230. In addition, the cover 130 may also be used to mount the lens component of the camera apparatus.

Referring to FIG. 3 and FIG. 4, the drive component 400 may further include a drive chip 430, and the drive chip 430 is electrically connected to the coil 410 and an external device (not shown in the figure). The drive chip 430 may obtain, based on a signal of the external device, an angle and a direction of the image sensor 230 that needs to rotate, and input a corresponding current to the coil 410, so that the coil 410 drives the permanent magnet 420 to rotate, to implement shake compensation. The image sensor anti-shake component may be prepared, accepted, and mounted as a complete component.

The image sensor anti-shake component may further be provided with a location sensor 440. The location sensor 440 is connected to the drive chip 430 via a signal. The location sensor 440 is configured to collect location information of the rotating platform 210 or collect location information of the image sensor 230. The drive chip 430 may receive a signal from the location sensor 440 as a feedback signal of a motion location of the rotating platform 210, to improve precision of anti-shake control.

The location sensor 440 may be a magnetic sensor, an optical sensor, an acoustic sensor, an electrical sensor, a thermal sensor, a mechanical sensor, a chemical characteristic sensor, or the like. A type of the location sensor 440 is not limited in this application, and a user may select an appropriate sensor type based on a requirement. Specifically, when the location sensor 440 is a magnetic sensor, a location of the permanent magnet 420 may be directly monitored by using the magnetic sensor. A structure is simple, and no additional monitoring mark is required to be prepared. In a specific embodiment, the location sensor 440 may be a Hall sensor, and there is a Hall permanent magnet 450 corresponding to the Hall sensor. The Hall sensor may be disposed on the fixed component 100, and the Hall permanent magnet 450 is disposed on the rotating component 200. Therefore, the Hall sensor may be used to monitor a location of the Hall permanent magnet 450 and a location of the rotating component 200. Certainly, the Hall permanent magnet 450 may be located on the fixed component 100, and the Hall sensor may be located on the rotating component 200. The Hall sensor and the drive chip 430 may be located in a same component, to facilitate signal transmission between the drive chip 430 and the Hall sensor.

In an embodiment, the coil 410, the location sensor 440, and the drive chip 430 are fastened to and electrically connected to the first circuit board 120. The coil 410, the location sensor 440, and the drive chip 430 may be electrically connected to the first circuit board 120 by welding to an electrode of the first circuit board 120, and may be fastened to the first circuit board 120 by bonding, riveting, or laser bonding. A specific process of fastening the first circuit board 120 to the base 110 is not limited. For example, fastening may be performed by bonding, by riveting, by using a screw joint, or by laser bonding.

A specific material and a manufacturing process of the coil 410 are not limited. For example, the coil 410 may be formed by winding a copper wire, or may be formed by etching or stacking a copper plate. This is not limited in this application.

Referring to FIG. 3 and FIG. 4, the rotating component 200 includes a flexible circuit board 240. One end of the flexible circuit board 240 is connected to the image sensor 230, and the other end thereof can be electrically connected to the external device, to transmit, to an external processing unit, a signal corresponding to an image obtained by the image sensor 230. In this way, a photographing function of the camera apparatus is completed. In addition, the flexible circuit board 240 has flexibility. Specifically, the flexible circuit board 240 may have a specific fold, so that the flexible circuit board 240 can adapt to rotation of the rotating component 200 without affecting the rotation of the rotating component 200. In addition, strength of the flexible circuit board 240 is high, and reliability of the flexible circuit board 240 is better than that of a conducting wire. A problem of a circuit break caused by frequent movement is less likely to occur. To improve reliability, a large area of the flexible circuit board 240 may be fastened to the second circuit board 220, thereby reducing a circuit break risk.

In addition, the movable component 300 may further include an elastic reset part (not shown in the figure), such as a spring. The elastic reset part is connected between the rotating platform 210 and the base 110. After the rotating platform 210 is driven by the drive component 400 to rotate, when no current passes through the coil 410 of the drive component 400, the elastic reset part may reset the rotating platform 210 to an initial state for next photographing. For example, the elastic reset part is a spring located in each direction of a periphery of the rotating platform 210, or a spring that is located between the rotating platform 210 and the cover 130 and that is perpendicular to the rotating platform 210, or a spring that is located between the rotating platform 210 and the base and that is perpendicular to the rotating platform 210. Certainly, in another embodiment, the image sensor anti-shake component may not include the elastic reset part. During each time of photographing, through control by the drive chip 430, the drive component 400 drives the rotating platform 210 to rotate to a required location.

The base 110 in the foregoing embodiment may be a plastic base 110, to prevent magnetic interference. Alternatively, metal may be embedded in a plastic material as the base 110, to improve strength of the base 110. Certainly, the base 110 may alternatively be a metal base 110. This is not limited in this application.

To achieve that the rotating component 200 is axially fastened to the fixed component 100, and that the rotating component 200 and the fixed component 100 can be driven by the drive component 400 to rotate along the first plane M, the movable component 300 may include a middle rotating part 310 and a peripheral supporting part 320. The middle rotating part 310 is connected between the rotating platform 210 and the base 110, so that the rotating component 200 is axially fastened to the fixed component 100. To be specific, the rotating component 200 and the fixed component 100 can only rotate relatively and cannot move relatively. The peripheral supporting part 320 and the middle rotating part 310 form a plane supporting part, so that the rotating platform 210 can be kept on the first plane M without a tilt, and the rotating platform 210 can be stably connected to the base 110.

In a specific embodiment, the peripheral supporting part 320 includes at least two rolling balls 321, and the at least two rolling balls 321 are arranged on a periphery of the middle rotating part 310. In this way, a plane supporting part is conveniently formed by the rolling balls 321 and the middle rotating part 310, and rotation between the rotating platform 210 and the base 110 is not affected. Smoothness of motion of the rotating component 200 is ensured.

The middle rotating part 310 may be implemented in a plurality of manners. In one implementation, referring to FIG. 3 and FIG. 4, the middle rotating part 310 includes a central rolling ball 311 and rolling ball accommodating space 312. Specifically, the rolling ball accommodating space 312 includes a first part 3121 located on the base 110 and a second part 3122 located on the rotating platform 210. The first part 3121 and the second part 3122 each have a wall adapted to the central rolling ball 311. The wall limits a location of the central rolling ball 311, so that the central rolling ball 311 does not move along the first plane M, and the rotating platform 210 does not move relative to the base 110 but can only rotate.

Materials of the rolling balls 321 and the central rolling ball 311 may be metal or ceramic, which is not limited in this application. Only strength and abrasion resistance of each of the rolling balls 321 and the central rolling ball 311 need to be ensured.

Figure 5:
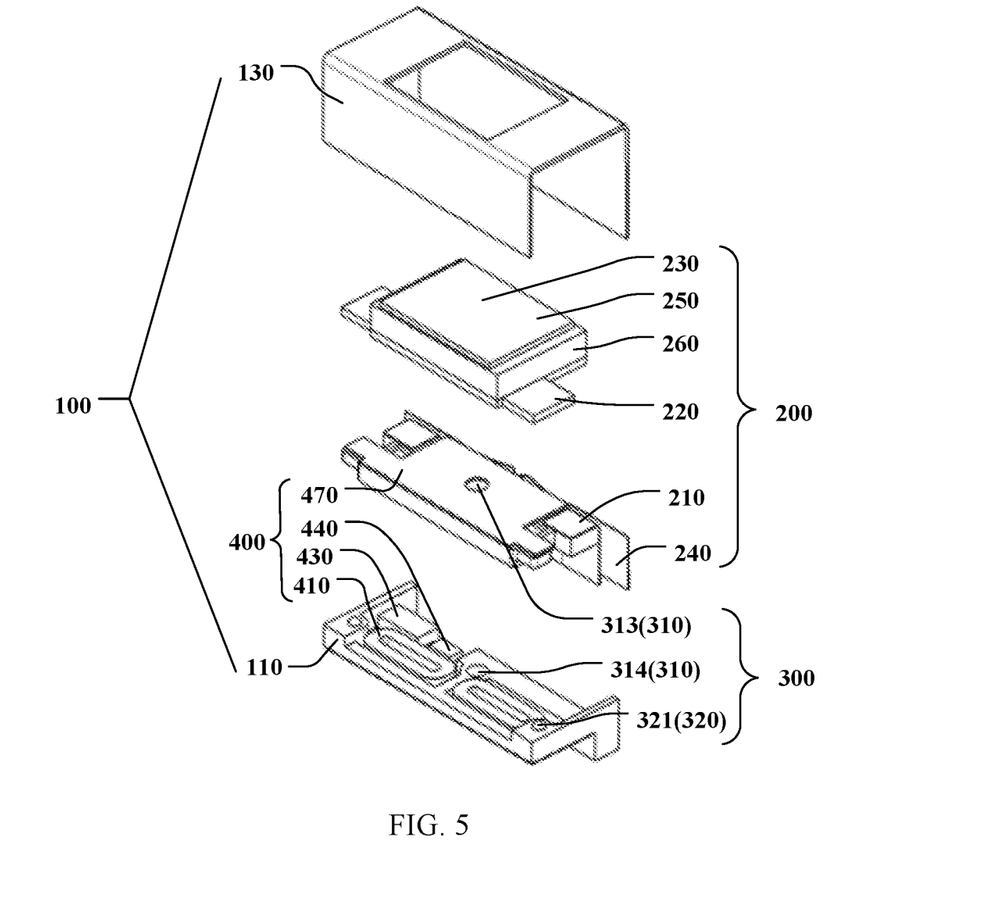
FIG. 5 is a schematic diagram of an exploded structure of an image sensor anti-shake component according to another embodiment of this application.
Figure 6:
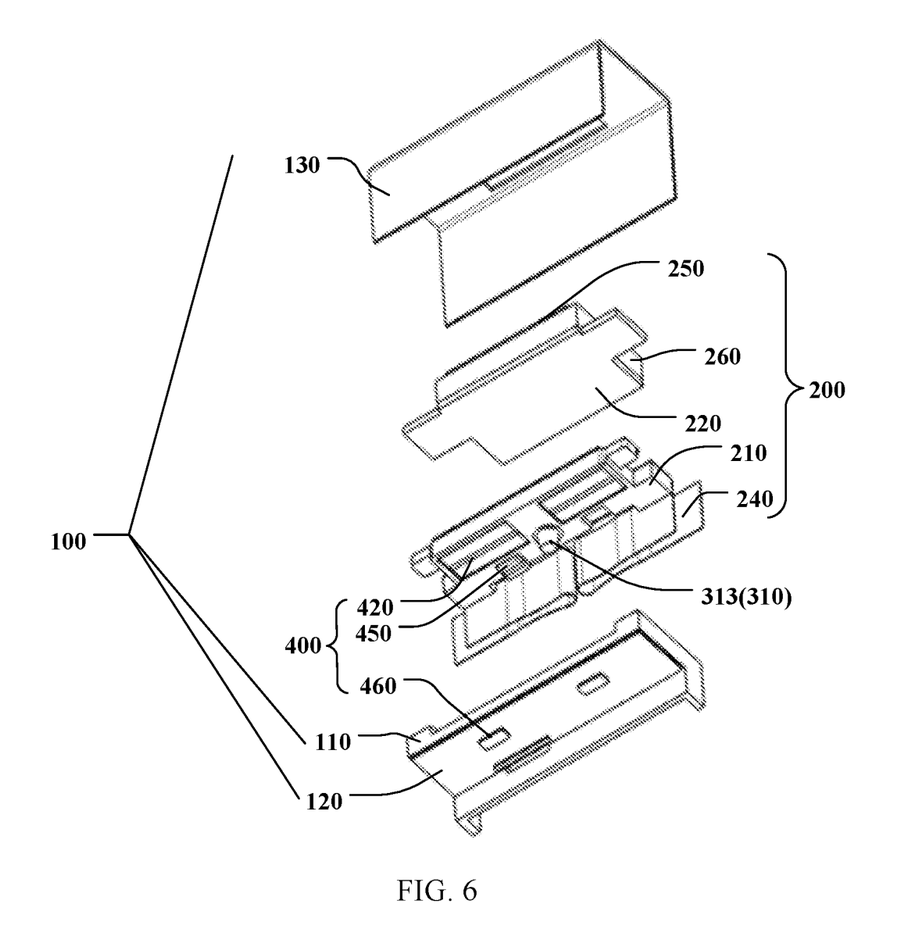
FIG. 6 is another schematic diagram of an exploded structure of an image sensor anti-shake component according to another embodiment of this application.

FIG. 5 is a schematic diagram of an exploded structure of an image sensor anti-shake component according to another embodiment of this application. FIG. 6 is another schematic diagram of an exploded structure of an image sensor anti-shake component according to another embodiment of this application.

As shown in FIG. 5 and FIG. 6, in another implementation, the middle rotating part 310 includes a middle rotating shaft 313 and a shaft hole 314. The middle rotating shaft 313 and the shaft hole 314 are adapted to each other, and the middle rotating shaft 313 can rotate within the shaft hole 314. Specifically, the middle rotating shaft 313 may be disposed on the rotating platform 210, and the shaft hole 314 may be disposed on the base 110. Alternatively, the middle rotating shaft 313 is disposed on the base 110, and the shaft hole 314 is disposed on the rotating platform 210. In this solution, fitting between the middle rotating shaft 313 and the shaft hole 314 makes it more difficult for the rotating platform 210 and the base 110 to move relatively, and a connection structure is more reliable.

When the middle rotating shaft 313 is specifically disposed, the middle rotating shaft 313 may be a column-shaped middle rotating shaft, and the shaft hole 314 is a cylindrical shaft hole. To be specific, a shape of a cross section that is of the middle rotating shaft 313 and that is along a direction perpendicular to the first plane M may be a trapezoidal shape. A shape of a cross section that is of the shaft hole 314 and that is along the direction perpendicular to the first plane M may be a rectangular. An area of a section that is of the column-shaped middle rotating shaft and that is parallel to the first plane M gradually increases along a direction away from the shaft hole 314, so that a size on a side that is of the column-shaped middle rotating shaft and that faces the cylindrical shaft hole is small. This helps to mount the column-shaped middle rotating shaft into the shaft hole 314. In addition, the column-shaped middle rotating shaft and the shaft hole may be in line contact, so that the rotating platform 210 can rotate relative to the base 110 without a tilt.

Figure 7:
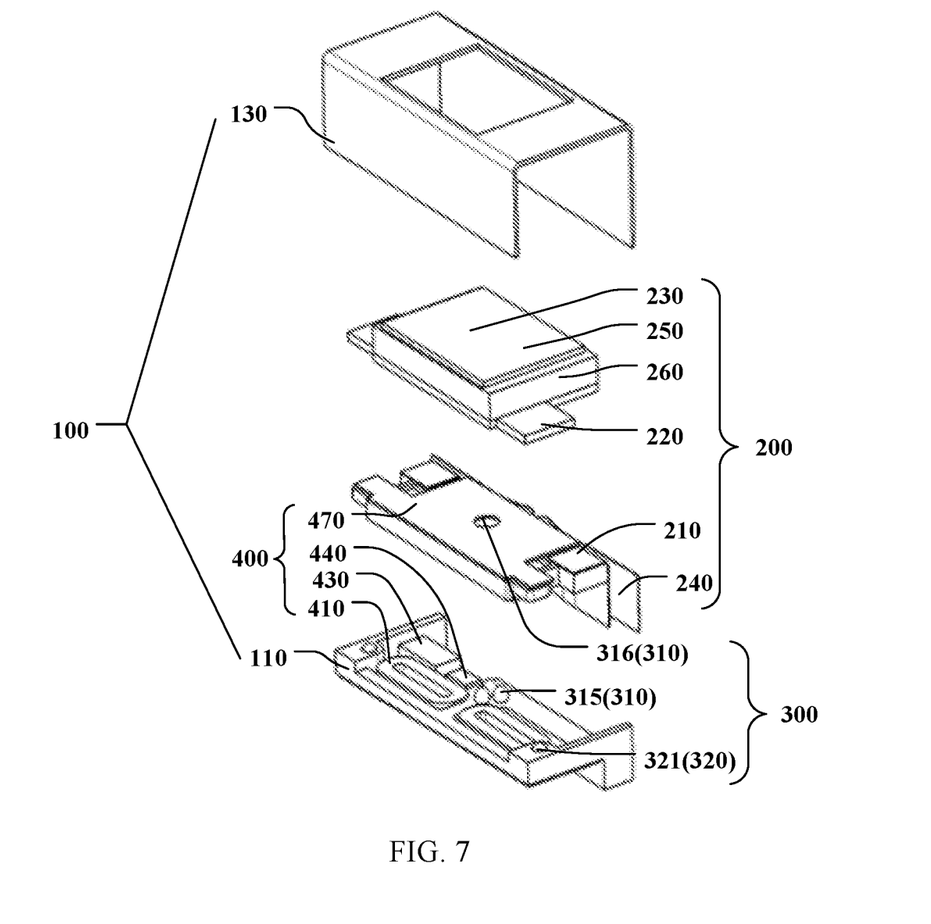
FIG. 7 is a schematic diagram of an exploded structure of an image sensor anti-shake component according to still another embodiment of this application.
Figure 8:
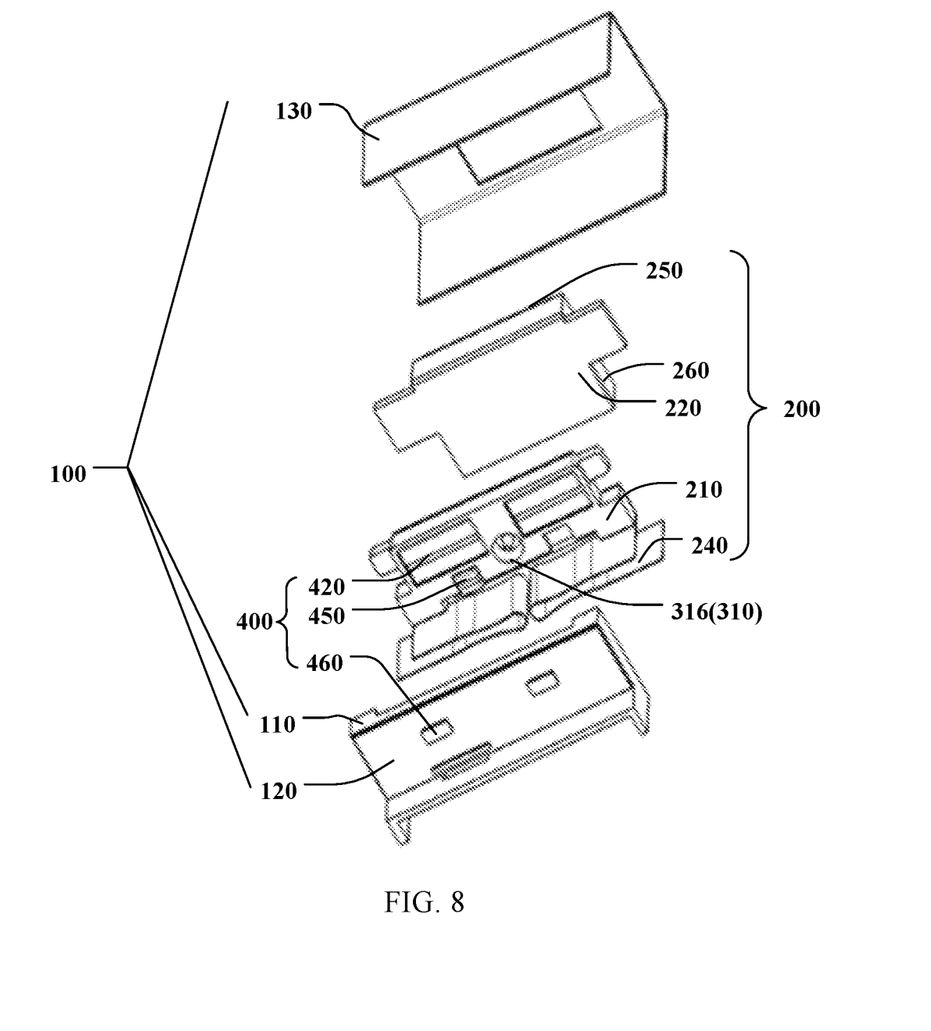
FIG. 8 is another schematic diagram of an exploded structure of an image sensor anti-shake component according to still another embodiment of this application.

FIG. 7 is a schematic diagram of an exploded structure of an image sensor anti-shake component according to still another embodiment of this application. FIG. 8 is another schematic diagram of an exploded structure of an image sensor anti-shake component according to still another embodiment of this application.

As shown in FIG. 7 and FIG. 8, in still another implementation, the middle rotating part 310 includes a bearing ball and a bearing slot 316 for accommodating the bearing ball. The bearing ball is accommodated in the bearing slot 316. The bearing ball is accommodated in the bearing slot 316 to form a bearing, so that the rotating component 200 and the fixed component 100 can only rotate and cannot move. In addition, because cross sections of both the bearing ball and the bearing slot 316 in a direction parallel to the first plane M are large, the rotating component 200 can be kept on the first plane M. Therefore, the bearing ball and the bearing slot 316 may be used as the middle rotating part 310 or the peripheral supporting part 320. There is no need to additionally provide a separate peripheral supporting part 320.

Certainly, in this embodiment, an additional peripheral supporting part 320, for example, the rolling ball 321 disposed on a periphery, may be disposed, to prevent the rotating component 200 from colliding with the fixed component 100, thereby improving structural stability of the image sensor anti-shake component.

In another specific embodiment, the image sensor anti-shake component further includes a first magnetic component 460. The first magnetic component 460 and the coil 410 are located in a same component. To be specific, if the coil 410 is located in the fixed component 100, the first magnetic component 460 is also located in the fixed component 100, or if the coil 410 is located in the rotating component 200, the first magnetic component 460 is also located in the rotating component 200. The first magnetic component 460 is magnetically attached to the permanent magnet 420. In this solution, the rotating platform 210 may tend to approach toward a side of the base 110 and press against the movable component 300. In this solution, a possibility that the image sensor 230 moves close to or away from the first circuit board 120 or a possibility of a tilt angle toward the first circuit board 120 can be reduced, interference to the image sensor 230 can be reduced, and imaging quality of the camera apparatus can be improved. In addition, the first magnetic component 460 may be disposed on a side of the coil 410 facing away from the permanent magnet 420, so that more magnetic lines of the permanent magnet 420 can pass through the coil 410, to improve a driving effect of the coil 410 on the permanent magnet 420, and improve anti-shake performance of the image sensor anti-shake component. In addition, when the location sensor 440 includes the Hall sensor and the Hall permanent magnet 450, the first magnetic component 460 may further allow more magnetic lines of the Hall permanent magnet 450 to pass through the Hall sensor, to improve reliability of the location sensor 440.

Specifically, the first magnetic component 460 may be an integral plate-shaped magnetic component, for example, a yoke plate. Alternatively, the first magnetic component 460 and the permanent magnet 420 may be in a one-to-one correspondence, or the first magnetic component 460 may correspond to a part of the permanent magnet 420. When the first magnetic component 460 is specifically disposed, a specific manner of fastening the first magnetic component 460 to the base 110 is not limited. For example, the first magnetic component 460 may be mounted by bonding or welding.

In another specific embodiment, the image sensor anti-shake component further includes a second magnetic component 470. The second magnetic component 470 is located between the permanent magnet 420 and the image sensor 230, so that the second magnetic component 470 can block electromagnetic interference from the permanent magnet 420 to the image sensor 230, and adherence of the permanent magnet 420 during assembly can be improved. The second magnetic component 470 may further enhance a heat dissipation effect of the image sensor anti-shake component, and improve strength of the image sensor anti-shake component. The second magnetic component 470 may be a plate-like magnetic component, for example, a yoke plate. Certainly, the second magnetic component 470 may alternatively be a multi-block structure. For example, the second magnetic component 470 and the permanent magnet 420 may be in a one-to-one correspondence. This is not limited in this application.

Specifically, when the first magnetic component 460 and the second magnetic component 470 are specifically prepared, an attachment process may be used for fastening, or preparation may be performed in an insert molding manner.

Figure 9:
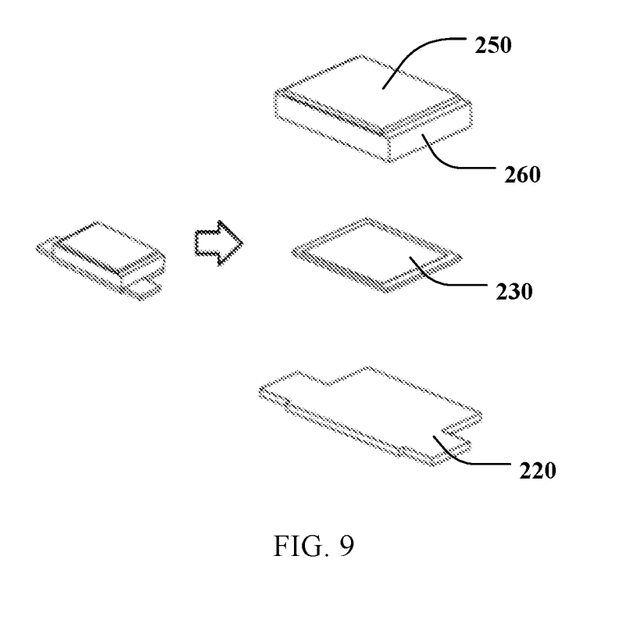
FIG. 9 is a schematic diagram of an exploded structure of a combination of an image sensor and a light filter according to an embodiment of this application.

Referring to FIG. 3, FIG. 4, and FIG. 9, FIG. 9 is a schematic diagram of an exploded structure of a combination of an image sensor 230 and a light filter according to an embodiment of this application. In an embodiment of this application, the image sensor anti-shake component may further include an infrared light filter 250, configured to filter infrared light entering the image sensor 230, to improve photographing quality. The infrared light filter 250 is disposed opposite to the image sensor 230, and a vertical projection of a sensing area of the image sensor 230 toward the first circuit board 120 is located within a vertical projection of the infrared light filter 250 toward the first circuit board 120. The image sensor anti-shake component may include a light filter supporting frame for mounting the infrared light filter 250. The infrared light filter 250 may be mounted on the cover 130 or on the rotating platform 210.

When the infrared light filter 250 is mounted on the rotating platform 210, the infrared light filter 250 may move together with the image sensor 230, thereby ensuring that all light rays can pass through the infrared light filter 250 and be received by the image sensor 230. When the infrared light filter 250 is mounted on the cover 130, an area of the infrared light filter 250 needs to be large, so that when the image sensor 230 rotates with the rotating platform 210, the vertical projection of the sensing area of the image sensor 230 toward the first circuit board 120 can also be ensured to be located within the vertical projection of the infrared light filter 250 toward the first circuit board 120.

In an embodiment, referring to FIG. 9, the infrared light filter 250 is mounted using a light filter holder 260. The light filter holder 260 may be disposed on a periphery of the image sensor 230, and cooperates with the second circuit board 220 and the light filter to form a closed cavity, to block external stray light and dust, reduce interference of the stray light and dust to the image sensor 230, and improve a working effect of the image sensor 230.

When the rotating platform 210 in this application is specifically prepared, a material of the rotating platform 210 is not limited. To improve a heat dissipation effect of the image sensor 230, the rotating platform 210 has at least a metal part in a region in which the image sensor 230 is contacted. Specifically, the rotating platform 210 may be a metal rotating platform 210. Alternatively, a surface that is of the rotating platform 210 and that is in contact with the image sensor 230 has a metal part, such as a metal sheet. The metal part may not only rapidly dissipate heat for the image sensor 230, but also may implement shielding to shield interference from an external signal to the image sensor 230, for example, shield interference from the first circuit board 120 and the drive chip 430 to the image sensor 230. The metal part may be fastened by bonding, by welding, by using a screw joint, or by laser bonding.

Certainly, in a specific embodiment, a structure such as a graphite sheet or conductive adhesive may be further provided on the surface that is of the rotating platform 210 and that is in contact with the image sensor 230, to improve the heat dissipation effect of the image sensor 230.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. An image sensor anti-shake component, comprising:
 a fixed component comprising:
  a base; and
  a first circuit board fastened to the base;
 a rotating component comprising:
  a rotating platform;
  a second circuit board fastened to the rotating platform; and
  an image sensor fastened to and electrically coupled to the second circuit board;
 a movable component coupled between the fixed component and the rotating component such that the rotating component and the fixed component are configured to axially fasten along a first direction of an optical axis of a light ray incident on the image sensor during use of the image sensor anti-shake component; and a drive component comprising:
  a coil fastened to the fixed component; and
  a permanent magnet that is in a one-to-one correspondence with the coil,
    wherein either the permanent magnet is fastened to the rotating component, or the coil is fastened to the rotating component and the permanent magnet is fastened to the fixed component,
    wherein the coil is configured to generate a magnetic field as a current passes through the coil,
    wherein the magnetic field is configured to enable the permanent magnet to move relative to the coil and to drive the rotating component to rotate along a first plane and relative to the fixed component using the movable component, and
    wherein the first plane is perpendicular to the optical axis.

2. The image sensor anti-shake component of claim 1, wherein the drive component further comprises a drive chip that is coupled to the coil and that is configured to:
  couple to an external device; and
  control the current based on a signal from the external device.

3. The image sensor anti-shake component of claim 2, wherein the fixed component further comprises a location sensor that is coupled to the drive chip and that is configured to collect location information of the rotating platform, and wherein the drive chip is configured to control the current based on the location information.

4. The image sensor anti-shake component of claim 1, wherein the movable component comprises a flexible circuit board that is electrically coupled to the image sensor and that is configured to transmit a signal of the image sensor.

5. The image sensor anti-shake component of claim 1, wherein the movable component further comprises an elastic reset part that is coupled between the rotating platform and the base and that is for resetting the rotating platform along the first plane.

6. The image sensor anti-shake component of claim 1, wherein the movable component comprises:
  a middle rotating part that is coupled between the rotating platform and the base to implement axial fastening of the rotating platform and the base; and
  a peripheral supporting part, wherein the peripheral supporting part and the middle rotating part form a plane supporting part.

7. The image sensor anti-shake component of claim 6, wherein the peripheral supporting part comprises at least two rolling balls that are disposed on a periphery of the middle rotating part.

8. The image sensor anti-shake component of claim 6, wherein the middle rotating part comprises:
  a rolling ball accommodating space that comprises:
    a first part fastened to the base; and
    a second part fastened to the rotating platform; and
  a central rolling ball disposed in the rolling ball accommodating space.

9. The image sensor anti-shake component of claim 6, wherein the middle rotating part comprises a shaft hole and a middle rotating shaft that is adapted to the shaft hole.

10. The image sensor anti-shake component of claim 9, wherein the middle rotating shaft is column-shaped and comprises a section that is parallel to the first plane, wherein the shaft hole is cylindrical, and wherein an area of the section gradually increases along a second direction away from the shaft hole.

11. The image sensor anti-shake component of claim 6, wherein the middle rotating part comprises a bearing slot and a bearing ball disposed in the bearing slot.

12. The image sensor anti-shake component of claim 1, further comprising a magnetic component that is magnetically attached to the permanent magnet and that is located on a side of the coil facing away from the permanent magnet.

13. The image sensor anti-shake component of claim 1, further comprising a magnetic component that is located between the image sensor and the permanent magnet.

14. The image sensor anti-shake component of claim 1, further comprising an infrared light filter disposed opposite to the image sensor.

15. A camera apparatus, comprising:
  an image sensor anti-shake component, comprising:
    a fixed component comprising:
      a base; and
      a first circuit board fastened to the base;
    a rotating component comprising:
      a rotating platform;
      a second circuit board fastened to the rotating platform; and
      an image sensor fastened to and electrically coupled to the second circuit board;
    a movable component coupled between the fixed component and the rotating component such that the rotating component and the fixed component are configured to axially fasten along a direction of an optical axis of a light ray incident on the image sensor during use of the image sensor anti-shake component; and
    a drive component comprising:
      a coil fastened to the fixed component; and
      a permanent magnet that is in a one-to-one correspondence with the coil, wherein either the permanent magnet is fastened to the rotating component, or the coil is fastened to the rotating component and the permanent magnet is fastened to the fixed component, wherein the coil is configured to generate a magnetic field as a current passes through the coil, wherein the magnetic field is configured to enable the permanent magnet to move relative to the coil and to drive the rotating component to rotate along a first plane and relative to the fixed component using the movable component, and wherein the first plane is perpendicular to the optical axis; and
  a lens component mounted on a side of the image sensor facing away from the first circuit board.

16. The camera apparatus of claim 15, wherein the camera apparatus is a periscope camera apparatus.

17. An electronic device, comprising:
  a camera apparatus comprising:
    an image sensor anti-shake component, comprising:
      a fixed component comprising:
        a base; and
        a first circuit board fastened to the base;
      a rotating component comprising:
        a rotating platform;
        a second circuit board fastened to the rotating platform; and
        an image sensor fastened to and electrically coupled to the second circuit board;
      a movable component coupled between the fixed component and the rotating component such that the rotating component and the fixed component are configured to axially fasten along a direction of an optical axis of a light ray incident on the image sensor during use of the image sensor anti-shake component; and a drive component comprising:
  a coil fastened to the fixed component; and
  a permanent magnet that is in a one-to-one correspondence with the coil, wherein either the permanent magnet is fastened to the rotating component, or the coil is fastened to the rotating component and the permanent magnet is fastened to the fixed component, wherein the coil is configured to generate a magnetic field as a current passes through the coil, wherein the magnetic field is configured to enable the permanent magnet to move relative to the coil and to drive the rotating component to rotate along a first plane and relative to the fixed component using the movable component, and wherein the first plane is perpendicular to the optical axis; and a lens component mounted on a side of the image sensor facing away from the first circuit board.

18. The electronic device of claim 17, wherein the drive component further comprises a drive chip that is coupled to the coil and that is configured to:
  couple to an external device; and
  control the current based on a signal from the external device.

19. The electronic device of claim 18, wherein the fixed component further comprises a location sensor that is coupled to the drive chip and that is configured to collect location information of the rotating platform, and wherein the drive chip is configured to control the current based on the location information.

20. The electronic device of claim 17, wherein the movable component comprises a flexible circuit board that is electrically coupled to the image sensor and that is configured to transmit a signal of the image sensor.

* * * * *